United States Patent
Cukierman et al.

(10) Patent No.: US 9,736,297 B2
(45) Date of Patent: Aug. 15, 2017

(54) PHONE NUMBER CANONICALIZATION AND INFORMATION DISCOVERABILITY

(71) Applicant: Google Inc., Mountain View, CA (US)

(72) Inventors: Edward Ryan Cukierman, Redmond, WA (US); Eng-Liang Ch'ng, Kirkland, WA (US); Radhika Tamvada, Bothell, WA (US); Offir Bakshitz, Redmond, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/815,746

(22) Filed: Jul. 31, 2015

(65) Prior Publication Data
US 2017/0034344 A1 Feb. 2, 2017

(51) Int. Cl.
| | |
|---|---|
| H04M 3/42 | (2006.01) |
| H04W 4/16 | (2009.01) |
| H04W 8/18 | (2009.01) |
| G06Q 10/10 | (2012.01) |
| H04M 1/2745 | (2006.01) |

(52) U.S. Cl.
CPC .......... *H04M 3/4211* (2013.01); *G06Q 10/10* (2013.01); *H04M 1/2745* (2013.01); *H04W 4/16* (2013.01); *H04W 8/183* (2013.01)

(58) Field of Classification Search
CPC H04W 4/00–4/02; H04W 4/16–4/206; H04W 8/18–8/28; H04W 68/00–68/12; H04M 1/573–1/578; H04M 1/82
See application file for complete search history.

(56) References Cited

U.S. PATENT DOCUMENTS

| | | | | |
|---|---|---|---|---|
| 5,452,353 | A | * | 9/1995 | Menezes ......... H04M 1/274566 379/216.01 |
| 5,475,743 | A | * | 12/1995 | Nixon ............. H04M 1/274566 379/114.15 |
| 7,187,932 | B1 | | 3/2007 | Barchi |
| 8,923,812 | B1 | | 12/2014 | Koum et al. |
| 2003/0148790 | A1 | | 8/2003 | Pappalardo et al. |
| 2008/0166999 | A1 | | 7/2008 | Guedalia et al. |
| 2009/0034705 | A1 | * | 2/2009 | Janssen ................ H04M 1/575 379/142.06 |
| 2009/0312026 | A1 | | 12/2009 | Parameswar |

(Continued)

FOREIGN PATENT DOCUMENTS

| | | |
|---|---|---|
| EP | 0631418 | 12/1994 |
| EP | 2568694 | 3/2013 |

OTHER PUBLICATIONS

International Search Report and Written Opinion for International Application No. PCT/US2016/037653, dated Sep. 14, 2016, 12 pgs.

*Primary Examiner* — San Htun
(74) *Attorney, Agent, or Firm* — Patent Law Works LLP

(57) ABSTRACT

A system comprising a processor and a memory storing instructions that, when executed, cause the system to receive a phone number; generate a canonical representation of the phone number; compute a correlation analysis between the canonical representation of the phone number and a contacts database; identify at least one contact in the contacts database based on the correlation analysis; select data associated with the at least one contact; and populate information associated with the at least one contact based on the selected data for display to a user.

19 Claims, 5 Drawing Sheets

(56) References Cited

U.S. PATENT DOCUMENTS

| | | | | |
|---|---|---|---|---|
| 2010/0086111 A1* | 4/2010 | Gruchala | .......... | H04M 3/42059 |
| | | | | 379/93.17 |
| 2012/0010931 A1* | 1/2012 | Mehra | .................. | G06Q 10/107 |
| | | | | 705/14.16 |
| 2012/0051529 A1* | 3/2012 | Dobbins | ............... | H04L 61/106 |
| | | | | 379/142.06 |

* cited by examiner

PHONE NUMBER CANONICALIZATION AND INFORMATION DISCOVERABILITY

BACKGROUND

The disclosure relates to determining additional information from a canonical phone number and presenting the additional information to display to a user on a client device.

Often a user will save a contact on their phone which is just a phone number. When the phone number is associated with a business, many users will enjoy seeing things like hours of operation and street address which the business publishes but the user has not entered themselves into their phone.

SUMMARY

According to one innovative aspect of the subject matter in this disclosure, a system having one or more processors and a memory storing instructions that, when executed, cause the system to: receive a phone number; generate a canonical representation of the phone number; compute a correlation analysis between the canonical representation of the phone number and a database; identify at least one contact in the database based on the correlation analysis; select information associated with the at least one contact; and populate information associated with the at least one contact based on the selected information for display to a user.

In general, another innovative aspect of the subject matter described in this disclosure may be implemented in methods that include: receiving a phone number; generating a canonical representation of the phone number; computing a correlation analysis between the canonical representation of the phone number and a database; identifying at least one contact in the database based on the correlation analysis; select information associated with the at least one contact; and populating information associated with the at least one contact based on the selected information for display to a user.

Other implementations of one or more of these aspects include corresponding systems, apparatus, and computer programs, configured to perform the actions of the methods, encoded on computer storage devices.

These and other implementations may each optionally include one or more of the following features.

For instance, the operations further include: determining whether the phone number includes a country code; retrieving a call log associated with the user; identifying a valid country code based on the call log; applying the valid country code to the phone number; determining whether the phone number including the valid country code satisfies requirements of a country associated with the valid country code; performing standardization of the phone number including the valid country code; collecting user-defined information associated with the phone number; parsing the database for business contacts associated with the canonical representation of the phone and the user-defined information; identifying a business contact in the database; determining whether the business contact is based on a business-chain; identifying and aggregating relevant data or information associated with each business contact in the business-chain; and populating information of the business contact associated with the phone number using the relevant data or information for display to the user.

For instance, the features may include that the database includes business names associated with the canonical representation of the phone numbers, that the data associated with the contact includes additional information of a business, that the call log includes past phone numbers dialed by the user, and that identifying the country code is based on phone numbers dialed by the user in the call log.

These implementations are particularly advantageous in a number of respects. For instance, the technology described herein can be used for generating a canonical representation of a phone number a user entered. The canonical representation of the phone number can be then matched to a contact in a database and used to select additional information associated with the contact.

It should be understood that language used in the present disclosure has been principally selected for readability and instructional purposes, and not to limit the scope of the subject matter disclosed herein.

BRIEF DESCRIPTION OF THE DRAWINGS

The specification is illustrated by way of example, and not by way of limitation, in the figures of the accompanying drawings in which like reference numerals are used to refer to similar elements.

DETAILED DESCRIPTION

Systems and methods for providing additional information associated with a canonicalized phone number are discussed. For purposes of this disclosure, any phone number with a country code and a valid number of digits for that country will be considered canonicalized. Published data shows that only 20% of phone numbers currently stored in databases are canonicalized. However, inferring a country and a country code to the phone numbers stored in the database increases the percentage of canonicalized phone numbers 80%. The remaining phone numbers are unfixable due to defects like having an invalid number of digits.

Inferring phone numbers may include, for example, generating a canonical representation of a phone number. A phone number (arbitrary string) is received as a user has entered the phone number to save as contact information on their phone. A phone number may be inferred based on a geographical location (e.g., address) associated with the phone number. In some implementations, a country code is determined based on certain signals or a combination of signals. For example, the country code may be manually provided by the user upon entering the number; the country code may be based on the country the user was in when he/she agreed on the TOS (the thinking being that if one leaves out a country code, then it is one's home country code); the country code may be based on the default, the country code may be based on the ones that the user contacts most frequently; or the country code may be based on a combination of the aforementioned signals. Once a country code is determined, a canonical representation is generated. Further, once the canonical representation is generated, that canonical representation is compared to a database of business information to find a business with a number that matches. If there is one match, relevant information about that business is selected and sent to the user device for presentation to the user, along with the contact information that the user has entered. If there is more than one match (for example, if the number is the general number for a business with many locations), then the most general or relevant information is selected and sent to the user device for presentation. In some implementations, there may be multiple databases with portions of information for the same business. In these circumstances, the information from the multiple databases are received and pieced together to present to the user as associated with the business.

Further, inferring canonical phone numbers does not create data visible to people other than the user whose data is being used. Thus, a primary privacy concern may include making sure that during a data wipeout, a certain signal that was used for inference is removed via wipeout. If a signal is no longer present after wipe, the signal may not be used, and if an inference may not be generated, based on the signal, the signal will be removed.

Figure 1:
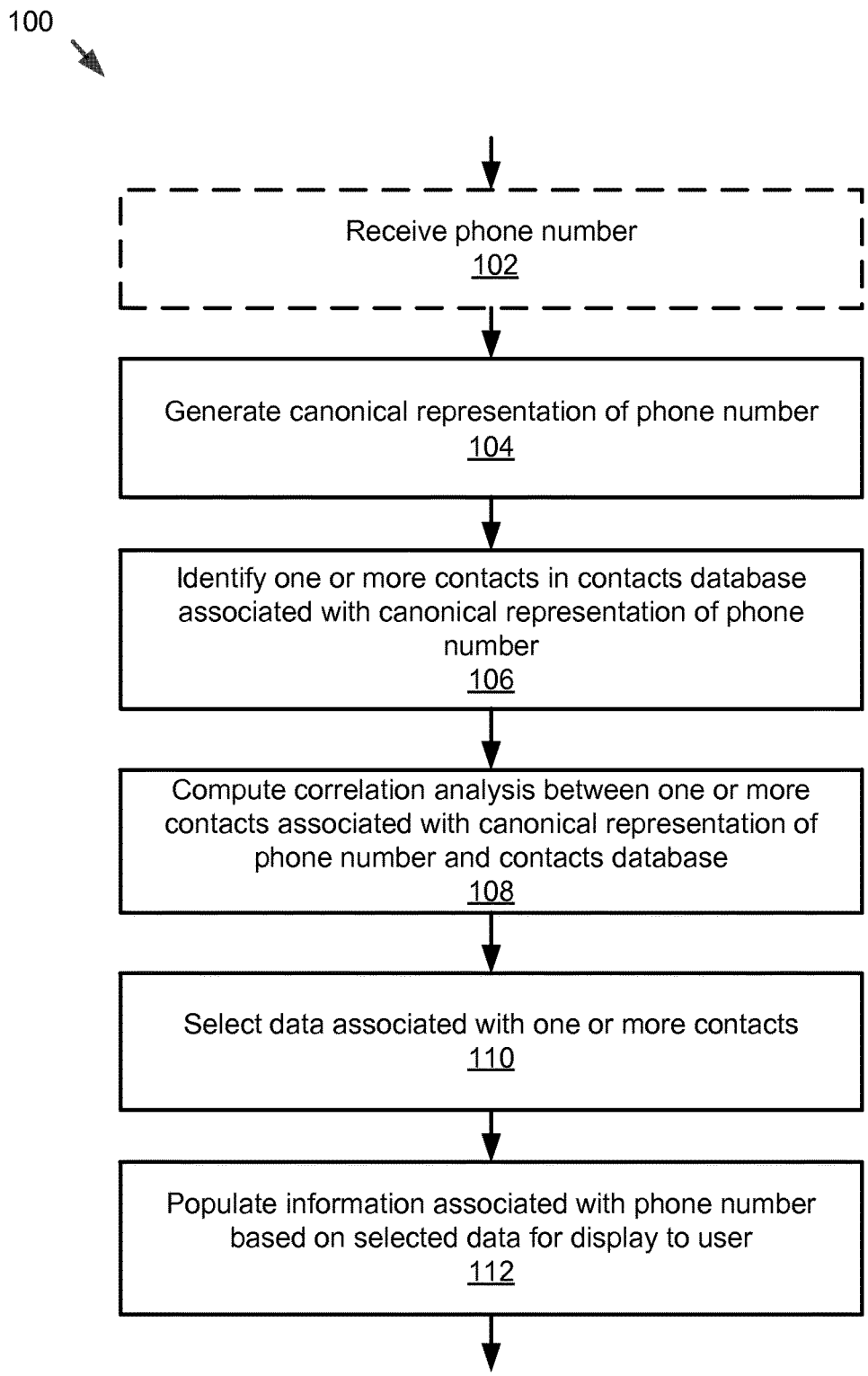
FIG. 1 is a flowchart of an example method for providing additional information associated with a phone number.

FIG. 1 is a flowchart of an example method for providing additional information associated with a phone number. The method 100 begins by receiving 102 a phone number. The phone number may be associated with an organization. In some implementations, a user interface module 520 receives a phone number from a user on a client device. The phone number may include, but is not limited to, a phone number associated with an organization. For example, a user may add a phone number associated with a business to a contacts directory on a user's client device (e.g., mobile phone). In some implementations, the operation performed in step 102 may be optional. In some implementations, the operations in step 102 may be performed by the user interface module 520 in cooperation with one or more other entities of the system 400, as discussed elsewhere herein.

Next, the method 100 continues by generating a canonical representation of the phone number. In some implementations, a standardization module 522, prior to generating a canonical representation of the phone number, may determine whether the phone number satisfies a criterion. For example, the criterion may include, but is not limited to, a phone number including a correct number of digits and an area code, and/or a country code, etc. In some implementations, the operations in step 104 may be performed by the standardization module 522 in cooperation with one or more other entities of the system 400, as discussed elsewhere herein.

The method 100 continues by identifying 106 one or more contacts in a database associated with the canonical representation of the phone number. In some implementations, responsive to receiving a canonical representation of a phone number, a phone number lookup module 524 may identify and retrieve one or more contacts from the database 510 matching the canonical representation of the phone number. In some implementations, the one or more contacts can be a set of contacts associated with one organization. For example, a set of contacts may include a plurality of physicians associated with a medical institution. In some implementations, the operations performed in step 106 may be performed by the phone number lookup module 524 and the correlation module 526 in cooperation with one or more other entities of the system 400, as discussed elsewhere herein.

Next, the method 100 continues by computing 108 a correlation analysis between the one or more contacts in the database associated with the canonical representation of the phone number. In some implementations, computing a correlation analysis includes identifying matching information between a canonical representation of a phone number and one or more contacts in a database. For example, the match may include a country code associated with one or more contacts in the database matching a country code associated with the canonical representation of the phone number. In some implementations, for example, a set of contacts may each be part of a business chain. For instance, the correlation module 526 may compute a correlation analysis between each contact in the set of contacts to determine if a contact in the set of contacts belongs to the organizational chain (e.g., business chain). In some implementations, the operations in step 106 may be performed by the phone number lookup module 524 and the correlation module 526 in cooperation with one or more other entities of the system 400, as discussed elsewhere herein.

The method 100 may then continue by selecting 110 data or information associated with the contact. In some implementations, a data selection module 528 may select a subset of data associated with the contact based on whether a preexisting contact stored on the client device of the user includes information matching the data of the contact. For example, a user may add a contact of a business and provide user-specified information associated with the business (e.g., geographical address). The data selection module 528 may then compare the data to the user-specified information associated with the contact and provide to the user a subset of the data that may include other information (e.g., FAX number, URL, hours of operation, etc.) associated with the business that may not be included in the user-specified information provided by the user. In some implementations, the operations performed in step 110 may be performed by the data selection module 528 in cooperation with one or more other entities of the system 400, as discussed elsewhere herein. Next, the method 300 may populate 112 information associated with the phone number based on the selected data. In some implementations, the populated information may be presented to the user for display. In some implementations, the data may be metadata.

Figure 2:
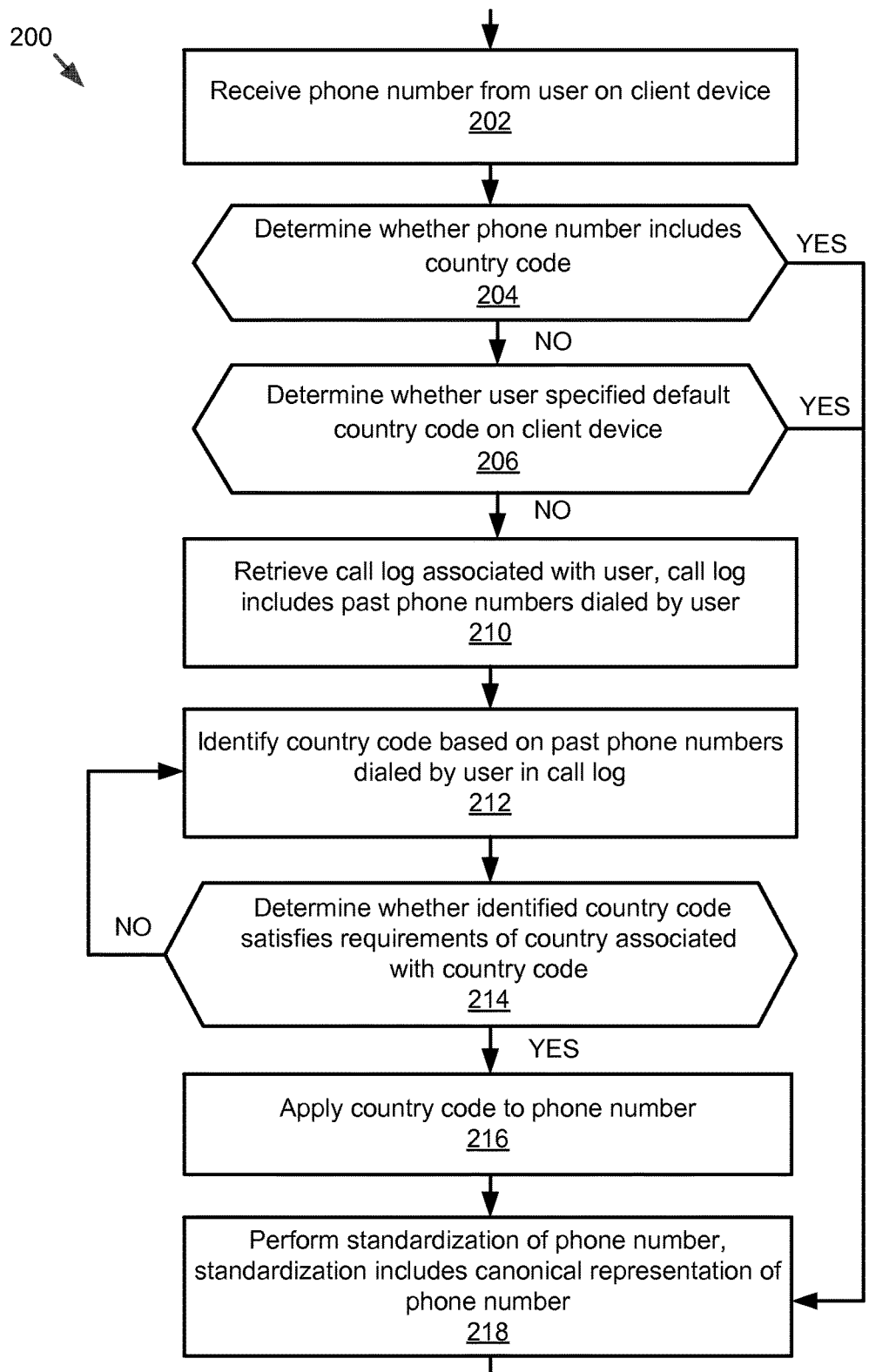
FIG. 2 is a flowchart of an example method for generating a canonical representation of a phone number.

FIG. 2 is a flowchart of an example method for generating a canonical representation of a phone number. The method 200 may begin by receiving 202 a phone number from a user on a client device. For example, a user may enter a phone number associated with a business to a contacts directory on user's client device (e.g., mobile phone). The user may enter the phone number to save as contact information on a client device of the user. In some implementations, the phone number entered by a user may be stored in memory of the client device and/or a database 510. In some implementations, the database 510 may be a contacts database. In some implementations, the operations performed in step 202 may be performed by the user interface module 520 in cooperation with one or more other entities of the system 400, as discussed elsewhere herein. Next, the method 200 may continue by determining 204 whether the phone number includes a country code. If the phone number includes a country code, the method 200 may continue to step 218. If the phone number does not include a country code, the method 200 may then continue to step 206.

The method 200 may then determine 206 whether a user specified a default country code on the client device. A user, in some implementations, may register an account associated with his/her client device. The account may include information including a user specified default country code. In some implementations, a user specified default country code may be associated with the client device and/or the account. For example, a user may register an account associated with his/her client device and specify a particular country for the account. If the determination in step 206 includes a user specified default country code on the client device, the method 200 may continue to step 218. If the determination in step 206 does not include a user specified default country code on the client device, the method 200 may continue to step 210. In some implementations, the operations performed in step 206 may be performed by the standardization module 522 in cooperation with one or more other entities of the system 400, as discussed elsewhere herein.

Next, the method 200 may continue by retrieving 210 a call log associated with a user. The call log may include, but is not limited to, past contacts/phone numbers dialed by the user. In some implementations, the operations performed in step 210 may be performed by the standardization module 522 in cooperation with one or more other entities of the system 400, as discussed elsewhere herein.

The method 200 may then continue by identifying 212 a country code associated with a phone number using the call log. In some implementations, identifying a country code may be based on high frequency contacts in the call log. The high frequency contacts can include one or more country codes associated with a phone number of each of the contacts in the high frequency contacts. For example, a high frequency contact may include a contact a user interacts with regularly (e.g., every day, once a week, etc.). In some implementations, the operations performed in step 212 may be performed by the standardization module 522 in cooperation with one or more other entities of the system 400, as discussed elsewhere herein.

The method 200 may then determine 214 whether the identified country code satisfies requirements of a country associated with the country code. For example, requirements of the country may include that the country code can be a valid country code used in association with a phone number. In some implementations, the requirements may include that the country code is associated with a correct number of digits. If the identified country code does not satisfy the requirements of the country associated with the country code, the method 200 may return to step 212. Otherwise, the method 200 may continue to step 216. In some implementations, the operations performed in step 214 may be performed by the standardization module 522 in cooperation with one or more other entities of the system 400, as discussed elsewhere herein.

Next, the method 200 may continue by applying 216 the country code to the phone number. In some implementations, the operations performed in step 216 may be performed by the standardization module 522 in cooperation with one or more other entities of the system 400, as discussed elsewhere herein. The method 200 may then continue by performing 218 standardization of the phone number. For example, standardization of the phone number may include a canonical representation of the phone number. In some implementations, the operations performed in step 218 may be performed by the standardization module 522 in cooperation with one or more other entities of the system 400, as discussed elsewhere herein.

Figure 3:
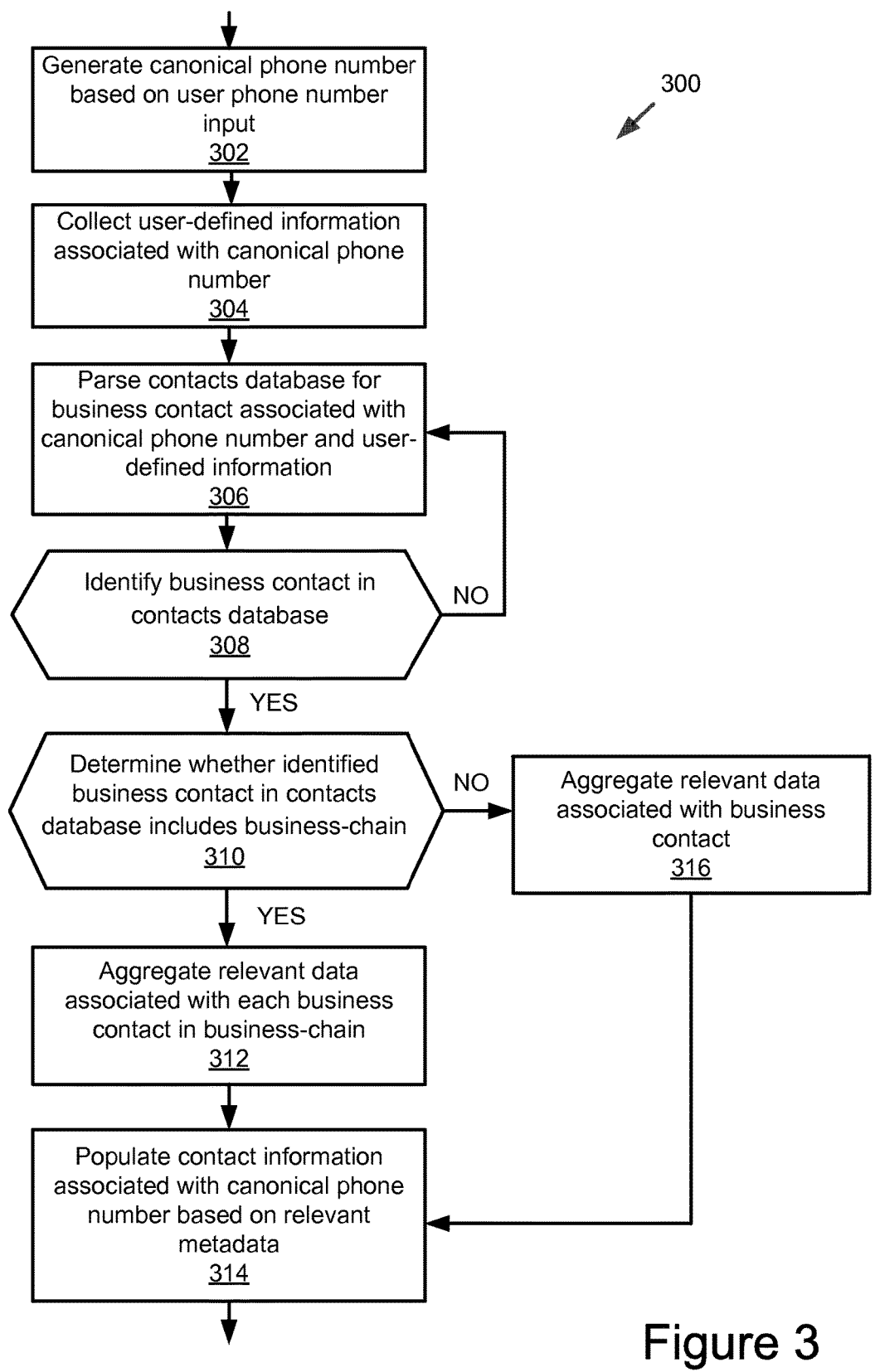
FIG. 3 is a flowchart of an example method for providing additional information based on a phone number associated with a business.

FIG. 3 is a flowchart of an example method for providing additional information based on a phone number associated with a business. The method 300 may begin by generating 302 a canonical phone number based on a user phone number input. The user phone number input may be a phone number entered by a user on his/her client device (e.g., mobile phone, and/or on a user application (not shown) of the client device) along with contact information. In some implementations, the operations performed in step 302 may be performed by the standardization module 522 in cooperation with one or more other entities of the system 400, as discussed elsewhere herein.

Next, the method 300 may continue by collecting 304 user-defined information associated with the canonical phone number. The user-defined information may include, but is not limited to, personal information (e.g., first name and/or last name) associated with a user of the canonical phone number, and/or demographic information (e.g., age, race, address, etc.). In some implementations, the operations performed in step 304 may be performed by the user interface module 520 in cooperation with one or more other entities of the system 400, as discussed elsewhere herein.

The method 300 may then continue by parsing 306 a contacts database for business contacts associated with the canonical phone number and the user-defined information. In some implementations, the operations performed in step 306 may be performed by the user interface module 520 in cooperation with one or more other entities of the system 400, as discussed elsewhere herein. The method 300 may then continue by identifying 308 a business contact in the contacts database. In some implementations, a business contact may be identified based on business information associated with the business (e.g., phone number, address, operating hours, etc.) If the identification in step 308 does not identify a business contact in the contacts database, the method 300 returns to step 306. If the method 300 identifies a business contact in the contacts database, the method 300 may continue to step 310. In some implementations, the operations performed in steps 306 and 308 may be performed by the phone number lookup module 524 and correlation module 526 in cooperation with one or more other entities of the system 400, as discussed elsewhere herein.

Next, the method 300 may continue by determining 310 whether the identified business contact in the contacts database includes a business chain. If the identified business contact includes a business chain, the method 300 may then continue to step 312. The method 300 may then aggregate 312 relevant data or information associated with each business contact in the business chain. Relevant data or information may include common information shared between each business contact in the business chain. In some implementations, business contacts associated with a business chain may be stored on multiple contacts databases (not shown), data or information may then be collected from the multiple contacts databases (not shown), and the data or information may be compared and aggregated to include relevant data or information between the business contacts stored on the multiple contacts databases. If the identified business contact does include a business chain, then the method 300 may continue to step 316. The method 300 may then aggregate 316 relevant data or information associated with the business contact. The relevant data or information may include common information between the one or more contacts. For example, the one or more contacts may be associated with one or more physicians associated with a medical institution, and the common information between the one or more contacts may include an address, operating hours, address, ownership, URL, etc., associated with the medical institution. In some implementations, the operations performed in steps 310, 312, and 316 may be performed by the phone number lookup module 524, the correlation module 526 and the data selection module 528 in cooperation with one or more other entities of the system 400, as discussed elsewhere herein.

The method 300 may then continue by populating contact information associated with the canonical phone number based on the relevant data or information. The contact information may include, but is not limited to, the relevant data or information or a subset of the relevant data. In some implementations, the contact information may be provided for display to a user on a client device (e.g., client device 406). In some implementations, the operations performed in step 314 may be performed by the user interface module 520 and/or the data selection module 528 in cooperation with one or more other entities of the system 400, as discussed elsewhere herein.

Figure 4:
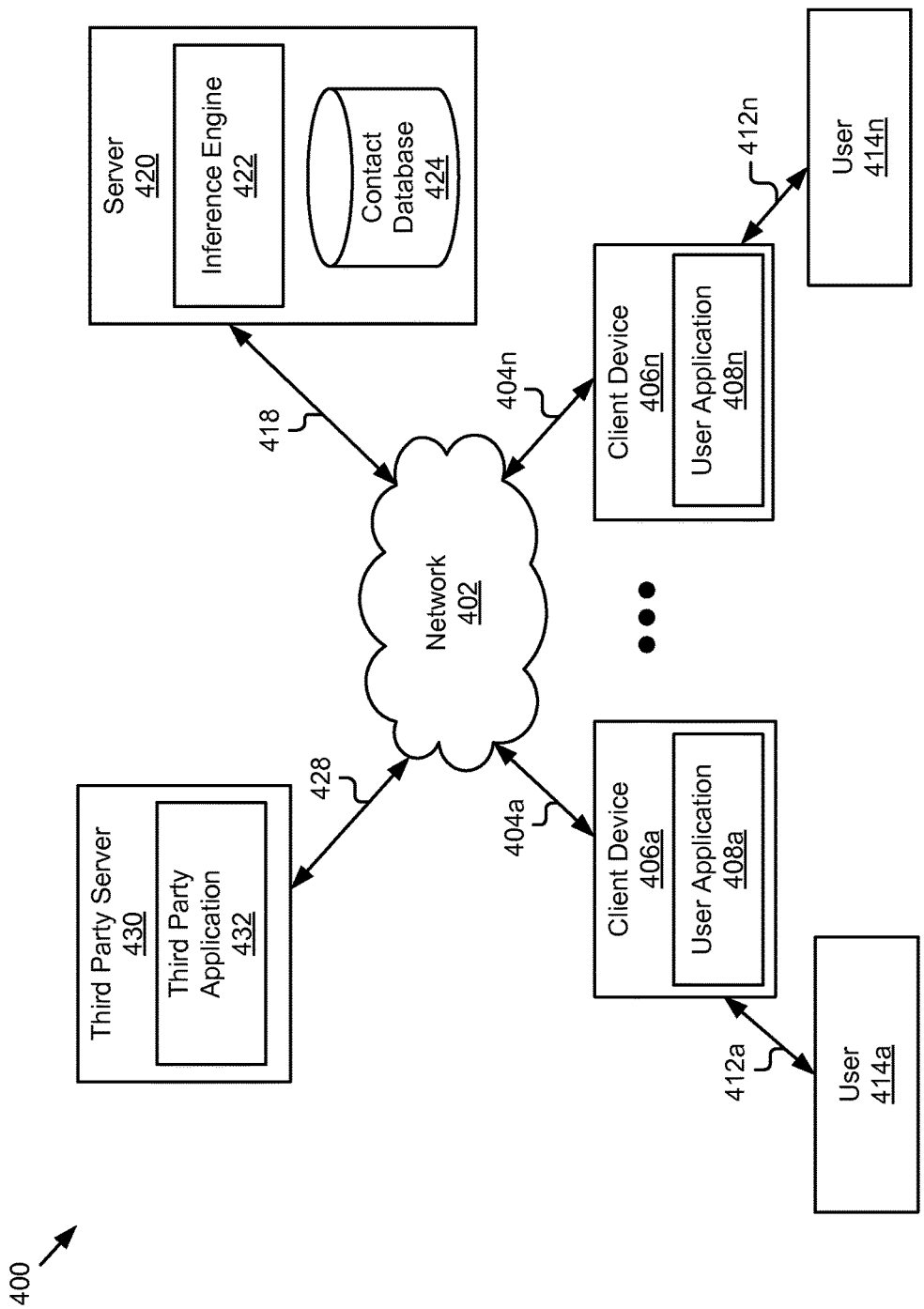
FIG. 4 is a block diagram illustrating an example system for providing additional information associated with a phone number.

FIG. 4 is a block diagram illustrating an example system for providing additional information associated with a phone number. In the depicted implementation, the system 400 may include client devices 406a through 406n, a server 420, and a third-party server 430. In the illustrated implementation, these entities of the system 400 are communicatively coupled via network 402. However, the present disclosure is not limited to this configuration and a variety of different system environments and configurations may be employed and are within the scope of the present disclosure. Other implementations may include additional or fewer computing devices, services, and/or networks.

It should be recognized that in FIG. 4 as well as the other figures used to illustrate an implementation, an indication of a letter after a reference number or numeral, for example, "406a" is a specific reference to the element or component that is designated by that particular reference numeral. In the event a reference numeral appears in the text without a letter following it, for example, "406," it should be recognized that such is a general reference to different implementations of the element or component bearing that general reference numeral.

In some implementations, the entities of the system 400 may use a cloud-based architecture where one or more computer functions or routines are performed by remote computing systems and devices at the request of a local computing device. For example, a client device 406 may be a computing device having hardware and/or software resources and may access hardware and/or software resources provided across the network 402 by other computing devices and resources, including, for instance, other client devices 406 (e.g., user devices), the server 420, and/or the third party server 430, or any other entities of the system 400.

The network 402 may be a conventional type, wired or wireless, and may have numerous different configurations including a star configuration, token ring configuration, or other configurations. Furthermore, the network 402 may include a local area network (LAN), a wide area network (WAN) (e.g., the Internet), and/or other interconnected data paths across which multiple devices may communicate. In some implementations, the network 402 may be a peer-to-peer network. The network 402 may also be coupled to or include portions of a telecommunications network for sending data in a variety of different communication protocols. In some implementations, the network 402 includes Bluetooth® communication networks or a cellular communications network for sending and receiving data including via short messaging service (SMS), multimedia messaging service (MMS), hypertext transfer protocol (HTTP), direct data connection, WAP, email, etc. In addition, although FIG. 4 illustrates a single network 402 coupled to the client devices 406, the server 420, and third party server 430 that are illustrated, in practice, one or more networks 402 may be connected to these entities.

In some implementations, the client devices 406 (any or all of 406a through 406n) are computing devices having data processing and data communication capabilities. In the illustrated implementation, the users 414a through 414n interact with the client devices 406a and 406n, via signal lines 412a and 412n, respectively. The client devices 406a through 406n are communicatively coupled to the network 402 via signal lines 404a through 404n respectively. Although two client devices 406 (e.g., 406a and 406n) are illustrated, the disclosure applies to a system architecture having any number of client devices 406 available to any number of users 414.

In some implementations, a client device 406 includes a mobile device; a workstation computer; a desktop computer; a laptop computer; a netbook computer; a tablet computer; a smartphone; a set-top box/unit; an Internet Protocol-connected smart TV including a computer processor capable of receiving viewer input, accessing video content on computer networks (e.g., the Internet), and executing software routines to provide enhanced functionality and interactivity to viewers; or the like. In some implementations, the client device 406 may be a handheld wireless computing device which may be capable of sending and receiving voice and/or data communications.

The client device 406 may include a computer processor, a memory, a power source, and a communication unit including one or more network interfaces for interacting with the network 402, including, for example, wireless transceivers to broadcast and receive network data via radio signals. The client device 406 may also include one or more of a graphics processor; a high-resolution touchscreen; a physical keyboard; forward and rear facing cameras; a Bluetooth® module; memory storing applicable firmware; and various physical connection interfaces (e.g., USB, HDMI, headset jack, etc.); etc.

Additionally, an operating system for managing the hardware and resources of the client device 406, application programming interfaces (APIs) for providing applications access to the hardware and resources, a user interface module for generating and displaying interfaces for user interaction and input, and applications including, for example, applications for placing calls, applications for web browsing, instant messaging with one or more other users through internet applications, and/or real-time video communication applications, etc., may be stored and operable on the client device 406. While FIG. 4 illustrates two or more client devices 406, the present disclosure applies to any system architecture having any number of client devices 406.

In some implementations, the client devices 406a through 406n contain user applications 408a through 408n and executable by a processor (not shown) of the client device 406 to provide for user interaction, and to send and receive data via the network 402. In particular, the user application can be operable to instruct the client device 406 to render user interfaces, receive user input, and send information to and receive information from the server 420, and the other entities of the system 400. In these or other implementations, the user application (not shown) may be stored in memory (not shown) of the client device 406 and is accessible and executable by a processor (not shown).

The server 420 can be a hardware server that includes a processor (not shown), a memory (not shown), and network communication capabilities. The server 420 is coupled to the network 402 via signal line 418 for communication and cooperation with the other components of the system 400. In some implementations, the server 420 sends and receives data to and from one or more of the client devices 406a, 406n, and/or the third-party server 430 via the network 402. Although one server is shown, persons of ordinary skill in the art will recognize that multiple servers can be utilized, either in a distributed architecture or otherwise. For the purpose of this application, the system configuration and operations performed by the system are described in the context of a single server 420.

In some implementations, the server 420 may include an inference engine 422 for generating a canonical representation of a phone number. The inference engine 422 can be a network-based software service operable to provide the computing functionalities, services, and/or resources to send data to and receive data from other entities of the network 402. For example, the inference engine 422 can provide users 414 with a service for Internet searching; electronic messaging; sharing; business services; news and media consumption or any combination of the foregoing services. It should be understood that the inference engine 420 is not limited to providing the above-noted services and may provide any other client or network-based service.

The third party server 430 includes one or more computing devices or systems for providing various computing functionalities, services, and/or resources to the other entities of the systems 400. In some implementations, the third party server 430 hosts a network-based software application (e.g., a third-party application 432) operable to provide computing functionalities, services and/or resources or functionalities, and to send data to and receive data from the other entities of the systems 400. In some implementations, the third party server 430 is a server, server array or any other computing device, or group of computing devices, having data processing, storing and communication capabilities. Examples of the types of software services that the third party server 430 may provide include, but are not limited to, include third-party searching; internt searching; social networking; web-based email; blogging; micro-blogging; multimedia hosting, distribution, and sharing; business services; news and media distribution; or any combination of the foregoing services. It should be understood that the third party server 430 are not limited to providing the above-noted services and may include any other network-based or cloud-based service.

Figure 5:
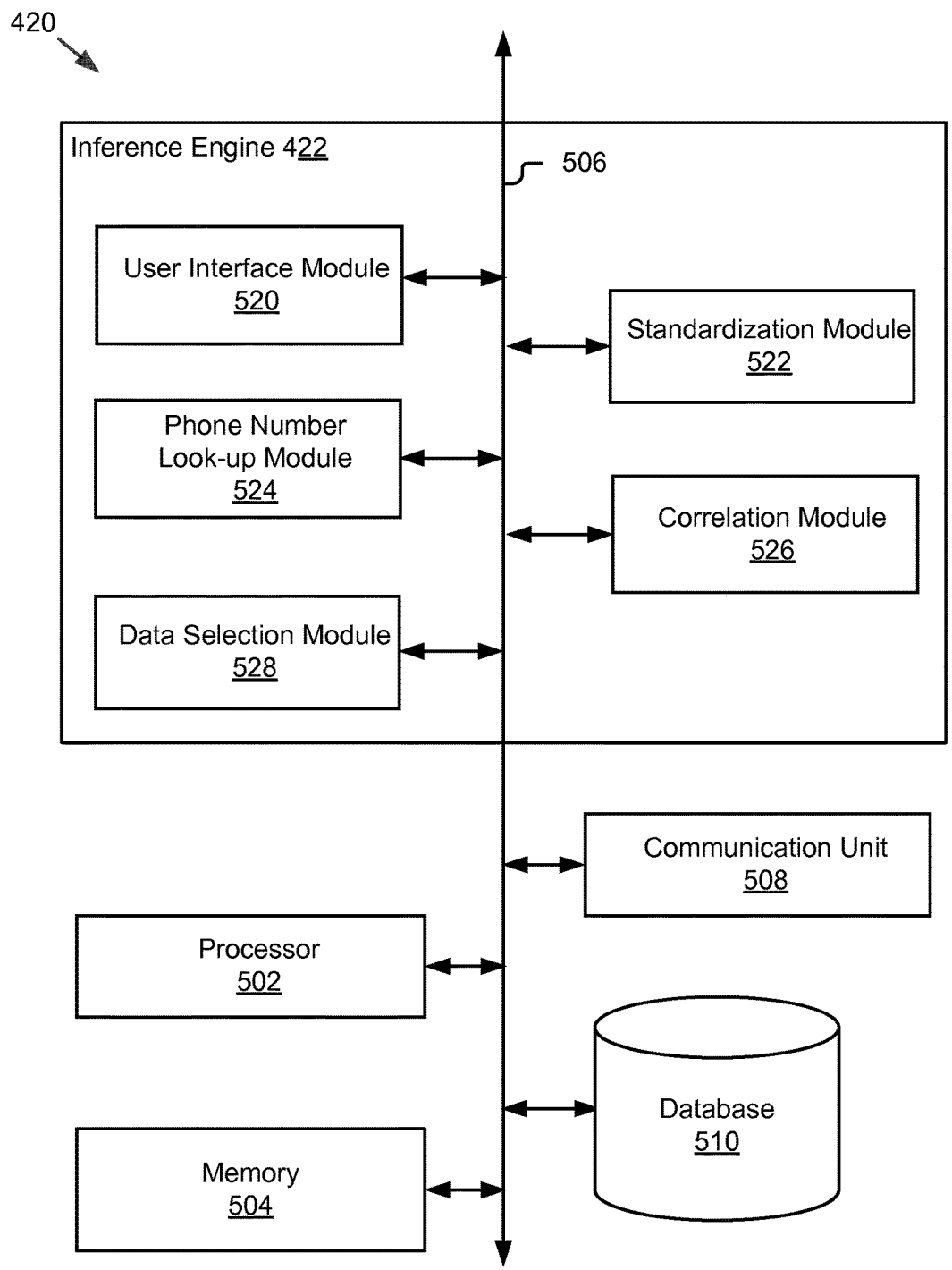
FIG. 5 is a block diagram illustrating an example server.

Referring now to FIG. 5, an example of a server is shown in more detail. FIG. 5 is a block diagram illustrating an example server. As depicted, the server 420 may include the inference engine 422, a processor 502, a memory 404, a communication unit 508, and a database 510, which may be communicatively coupled by a communication bus 506. It should be understood that the above configurations are provided by way of example and numerous further configurations are contemplated and possible.

The inference engine 422 is software, code, logic, or routines for receiving a phone number and populating contact information associated with the phone number. As depicted in FIG. 5, the inference engine 422 may include a user interface module 520, a standardization module 522, a phone number lookup module 524, a correlation module 526, and a data selection module 528.

In some implementations, the components 520, 522, 524, 526, and/or 528 are electronically communicatively coupled for cooperation and communication with each other, the processor 502, the memory 504, the communication unit 508, and/or the database 510. These components, 520, 522, 524, 526, and 528 are also coupled for communication with the other entities (e.g., user device 406, third-party server 430) of the system 400 via the network 402.

In some implementations, the user interface module 520, the standardization module 522, the phone number lookup module 524, the correlation module 526, and the data selection module 528 are sets of instructions executable by the processor 502, or logic included in one or more customized processors, to provide their respective functionalities. In some implementations, the user interface module 520, the standardization module 522, the phone number lookup module 524, the correlation module 526, and the data selection module 528 are stored in the memory 504 of the server 420 and are accessible and executable by the processor 502 to provide their respective functionalities. In any of these implementations, the user interface module 520, the standardization module 522, the phone number lookup module 524, the correlation module 526, and the data selection module 528 are adapted for cooperation and communication with the processor 502 and other components of the server 420.

The user interface module 520 is software, code, logic, or routines for receiving an input from a user. An input may include, but is not limited to, a phone number, e-mail address, geographical location address, and/or a URL. In some implementations, the user interface module 520 receives a phone number input from the user. The phone number may be associated with an organization, for example, but not limited to, a business, an educational institution, a government organization, a medical institution, etc. For example, a user may add a phone number associated with a business to a contacts directory on user's client device (e.g., mobile phone).

In some implementations, the user interface module 520 may receive additional information associated with the phone number, responsive to receiving the phone number input from the user. In some implementations, the user interface module 502 in cooperation with the third-party server 430, one or more entities of the inference engine 422, and/or system 400, may identify relevant data or information associated with the phone number and automatically provide the relevant data or information as additional information for the phone number to a user on the client device 406. The additional information may include, but is not limited to, information describing an organization, for example, operating hours, address, ownership, URL, etc. For instance, a user may, responsive to adding a phone number associated with a medical institution, provide additional information associated with the medical institution. The additional information associated with the medical institution, may include, but is not limited to, a geographical address of the medical institution. In some implementations, the user interface module 520 may transmit the input and the additional information to memory 504 and/or memory (not shown) of client device 406 for storing the input and the additional information. In some implementations, the user interface module 520 may transmit the input to the standardization module and/or phone number lookup module 524, which may then use those inputs to perform its acts and/or functionalities thereon.

In some implementations, the user interface module 520 receives a modification input from the user. The modification input may include the user interface module 520 receiving a request from a user to update a preexisting input stored on the client device of the user. For example, a user may request to update a phone number in his/her contacts directory. In some implementations, the user interface module 520 transmits the updated phone number to one or more entities of the inference engine 422 and/or system 400, which may then use the updated phone number to perform its acts and/or functionalities thereon.

In some implementations, the user interface module 520 receives an e-mail address input from a user. The e-mail may be associated with, but is not limited to, at least a personal, an organization, and/or a personal associated with an organization. In some implementations, the user interface module 520 may, in cooperation with the third-party server 430 and/or any other entities of system 400, determine a phone number associated with the e-mail address input. In some implementations, the user interface module 520 may transmit the phone number input associated with the e-mail to the standardization module 522 and/or phone number lookup module 524, which may then use those inputs to perform its acts and/or functionalities thereon.

In some implementations, the user interface module 520 receives a geographical address input from a user. The geographical address input may be associated with, but is not limited to, at least a person, an organization, and/or a person associated with an organization. In some implementations, the user interface module 520 may, in cooperation with the third-party server 430 and/or any other entities of system 400, determine a phone number associated with the geographical address input. In some implementations, the user interface module 520 may transmit the phone number input associated with the geographical address input to the standardization module 522 and/or phone number lookup module 524, which may then use those inputs to perform its acts and/or functionalities thereon. In some implementations, the user interface module 520 may transmit the one or more inputs as described above to the standardization module 522 and/or phone number lookup module 524, which may then use those inputs to perform its acts and/or functionalities thereon.

The standardization module 522 is software, code, logic, or routines for generating a canonical representation of an input. In some implementations, the standardization module 522 may receive an input from the user interface module 520. The standardization module 522 may then generate a canonical representation of the input. An input received from the user interface module 520 may include, but is not limited to, a phone number, e-mail address, geographical address, and a URL, etc. For example, the standardization module 522 may receive a phone number from the user interface module 520, and the standardization module 522 may then generate a canonical representation of the phone number. In some implementations, the standardization module 522 in cooperation with the user interface module 520 may provide the canonical representation of the input (e.g., phone number) for display to a user on a client device of the user. In some implementations, the standardization module 522 may transmit the canonical representation of the input to the phone number lookup module 524 and/or correlation module 526, which may then use the canonical representation of the input to perform its act and/or functionalities thereon. The standardization module 522 may automatically generate canonical representation of other phone numbers stored on a user's client device.

In further implementations, the standardization module 522 determines a call-period for a call initiated between a user and a contact of the user. The standardization module 522 may determine that the call-period for the call satisfies a predetermined threshold (e.g. 2 minutes, 5 minutes, 30 minutes, etc.). If the call-period satisfies the predetermined threshold, this may be indicative that the call initiated between the user and the contact of the user was intentional. In some implementations, responsive to the call-period satisfying the predetermined threshold, the standardization module 522, in cooperation with one or more other entities of the system 500, may determine if the phone number associated with the contact of the user includes a canonicalized phone number already generated previously and stored in the contacts database 424. If the phone number includes the canonicalized phone number in the contacts database 424, the canonicalized phone number associated with the contact of the user may be marked. In some implementations, marking the canonicalized phone number excludes the standardization module 522 and/or one or more other entities of system 500 from altering the canonicalized phone number stored in the contacts database 424 in the future.

In some implementations, the standardization module 522, prior to generating a canonical representation of the input, may determine whether the input satisfies a criterion. A criterion may include, but is not limited to, a format associated with the input. For example, the format may include, but is not limited to, a phone number including a correct number of digits and an area code, and/or a country code, etc. For example, the standardization module 522, responsive to receiving a phone number input from the user interface module 520, may determine whether the phone number includes a correct number of digits and/or country code. The phone number including a correct number of digits and/or a country code may be indicative of satisfying the criterion.

A user, in some implementations, may register an account associated with his/her client device. The account may include information including a user-specified default country code. In some implementations, a user-specified default country code may be associated with the client device and/or the account. The standardization module 522 may then determine a country code and/or an area code based on the information (e.g., user-specified default country code) included in the account. For example, a user may register an account associated with his/her client device service provider and specify a particular country for the account. In some implementations, the standardization module 522 may perform standardization of a phone number responsive to the phone number including a country code and/or a user specifying a default country code on an account associated with the user.

The standardization module 522, in some implementations, may determine a country code associated with a phone number, and whether the phone number includes a valid number of digits for the country code based on one or more heuristics. The one or more heuristics may include, but are not limited to, a call log, frequency associated with contacts in the call log, information associated with a user Wi-Fi login, a user login to the account, etc. In some implementations, the standardization module 522 may retrieve a call log associated with a user from a data store, for example, the memory 504, memory (not shown) of client device 406, and/or a data store (not shown) of the third-party server 430. The standardization module 522 may then identify a country code associated with a phone number using the call log. A call log may include, but is not limited to, past contacts/phone numbers dialed by the user. In some implementations, the standardization module 522 identifies a country code based on high frequency contacts in the call log. In some implementations, the standardization module 522 computes a confidence score for each country code identified in the call log. The confidence score may be indicative that a particular country code may be a valid country code for a phone number. For example, a high frequency contact may have a high confidence score and include a contact a user interacts with regularly (e.g., every day, once a week, etc.). In some implementations, the standardization module 522 determines a country code based on a geographical location associated with a user's recent Wi-Fi login. For example, the standardization module 522 may receive location information associated with a user's action describing a recent Wi-Fi login location from one or more entities of the inference engine 422 and/or other entities of the system 400.

The standardization module 522 can determine whether a country code identified satisfies requirements of a country associated with the country code. For example, requirements of the country may include that the country code can be a valid country code used in association with a phone number. In some implementations, responsive to satisfying requirements of the country associated with the country code, the standardization module 522 may apply the country code to the phone number. The standardization module 522 may then perform standardization of the phone number. For example, standardization of the phone number may include a canonical representation of the phone number.

In some implementations, the standardization module 522 receives from the user interface module 520 the modification input. The modification input may include a request from a user to update a preexisting input stored on the client device of the user. For example, a user may request to update a phone number in his/her contacts directory. In some implementations, the standardization module 522 receives the updated phone number and performs acts and/or functionalities as described above, for example, determining whether a valid country code, area code, and/or a correct number of digits are present and associated with the country and/or area code. In some implementations, the standardization module 522 may transmit the canonical representation of the input to the phone number lookup module 524 and/or correlation module 526, which may then use the canonical representation of the input to perform its act and/or functionalities thereon.

The phone number lookup module 524 is software, code, logic, or routines for parsing a database for a contact matching an input. In some implementations, the phone number lookup module 524 receives a standardized input. A standardized input received from the standardization module 522 may include, but is not limited to, a canonical representation of a phone number, e-mail, address, etc. For example, the phone number lookup module 524 may parse and retrieve one or more contacts from the database 510 matching the canonical representation. In some implementations, responsive to receiving a canonical representation of a phone number, the phone number lookup module 524 may parse and retrieve one or more contacts from the database 510 matching the canonical representation of the phone number. The phone number lookup module 524 may identify one or more contacts in the database 510 using a fuzzy name match between contacts stored in the database 510 and contact information entered by a user for a phone number.

The one or more contacts may be associated with an organization, for example, but not limited to, a business, an educational institution, a government organization, a medical institution, etc. In some implementations, the one or more contacts can be a set of contacts associated with one organization. For example, a set of contacts may include a plurality of physicians associated with a medical institution (e.g., one organization). In some implementations, the phone number lookup module 522 collects user-defined information (e.g., additional information provided by a user) associated with a phone number. The phone number lookup module 522 may then parse a database, for example, the database 510, for contacts based on the canonical representation of the phone number and the user-defined information associated with the phone number.

In some implementations, the phone number lookup module 522 parses and retrieves one or more contacts based on a canonical representation of an e-mail and/or address. For example, a user may have stored a contact in contacts directory of a client device of the user. The contact may include a geographical address location and/or e-mail. The phone number lookup module 522 may then identify and retrieve one or more contacts including information in the database 510 matching the geographical location (e.g., address associated with the contact) and/or e-mail. In some implementations, the phone number lookup module 522 transmits the one or more contacts matching the geographical location and/or e-mail to the correlation module 526 to perform its acts and/or functionalities thereon.

The correlation module 526 is software, code, logic, or routines for computing a correlation analysis between one or more contacts associated with a canonical representation of an input. In some implementations, the correlation module 526 computes a correlation analysis between one or more contacts associated with a canonical representation of a phone number. The one or more contacts may be received from the phone number lookup module 524. The correlation analysis may include aggregating relevant data or information associated with the one or more contacts. The relevant data or information may include, but is not limited to, information associated with the one or more contacts matching at least the canonical representation of the input (e.g., phone number). For example, the match may include, but is not limited to, a country code associated with the one or more contacts matching a country code associated with the canonical representation of the phone number.

In some implementations, the correlation module 526 receives one or more contacts associated with an organization. An organization may include, but is not limited to, a business(es), a medical institution, etc. In some implementations, the one or more contacts can be a set of contacts associated with a particular organization, for example, a business (e.g., business contacts). The correlation module 526 may then determine whether the one or more contacts identified in the database 510 include an organizational chain. For example, the set of contacts may each be part of a business chain (e.g., multiple individual franchises). The correlation module 526 may determine whether one or more contacts identified in a multiple contacts database (not shown) are part of an organizational chain.

In some implementations, the correlation module 526 computes a correlation analysis between each contact in the set of contacts to determine if a contact in the set of contacts belongs to the organizational chain (e.g., business chain). The correlation module 526 may then aggregate relevant data or information associated with each contact in the set of contacts associated with the organizational chain. For example, the correlation module 526 may aggregate relevant data or information associated with each business contact included in a business chain. In some implementations, the correlation module 526 transmits the relevant data or information to the data selection module 528 to perform its acts and/or functionalities thereon.

The data selection module 528 is software, code, logic, or routines for selecting data or information associated with a contact. In some implementations, the data selection module 528 receives from the correlation module 526 aggregated relevant data or information associated with one or more contacts. The relevant data or information may include common information between the one or more contacts. For example, the one or more contacts may be associated with one or more physicians associated with a medical institution, and the common information between the one or more contacts may include an address, operating hours, address, ownership, URL, etc., associated with the medical institution.

In some implementations, the data selection module 528 may select a subset of data or information associated with the relevant data or information based on whether a preexisting contact stored on the client device of the user includes information matching the relevant data or information. For example, a user may add a contact of a business and provide user-specified information (e.g., additional information) associated with the business (e.g., geographical address); the data selection module 528 may then compare the relevant data or information to the user-specified information (e.g., additional information) associated with the contact and provide to the user a subset of the relevant data or information that may include other information (e.g., FAX number, URL, hours of operation, etc.) associated with the business that may not be included in the user-specified information provided by the user. In some implementations, the data selection module 528 may populate contact information associated with a canonical phone number based on the relevant data or information. The contact information may include, but is not limited to, the relevant data or information or a subset of the relevant data. In some implementations, the data selection module 528 in cooperation with the user interface module 520 may provide the additional information for display to a user on a client device of the user.

The processor 502 may execute software instructions by performing various inputs, logical, and/or mathematical operations. The processor 502 may have various computing architectures to method data signals including, for example, a complex instruction set computer (CISC) architecture, a reduced instruction set computer (RISC) architecture, and/or an architecture implementing a combination of instruction sets. The processor 502 may be physical and/or virtual, and may include a single core or plurality of processing units and/or cores. In some implementations, the processor 502 may be capable of generating and providing electronic display signals to a display device, supporting the display of images, capturing and transmitting images, performing complex tasks including various types of feature selection and sampling, etc. In some implementations, the processor 502 may be coupled to the memory 504 via the bus 506 to access data and instructions therefrom and store data therein. The bus 506 may couple the processor 502 to the other components of the server 420 including, for example, the memory 504, the communication unit 508, and the database 510.

The memory 504 may store and provide access to data to the other components of the server 420. In some implementations, the memory 504 may store instructions and/or data that may be executed by the processor 502. The memory 504 is also capable of storing other instructions and data, including, for example, an operating system, hardware drivers, other software applications, databases, etc. The memory 504 may be coupled to the bus 506 for communication with the processor 502 and the other components of the server 420.

The memory 504 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 502. In some implementations, the memory 504 may include one or more of volatile memory and non-volatile memory (e.g., RAM, ROM, hard disk, optical disk, etc.). It should be understood that the memory 504 may be a single device or may include multiple types of devices and configurations.

The bus 506 may include a communication bus for transferring data between components of a computing device or between computing devices, a network bus system including the network 402 or portions thereof, a processor mesh, a combination thereof, etc. In some implementations, the server 420 and the third-party server 430 may cooperate and communicate via a software communication mechanism implemented in association with the bus 506. The software communication mechanism may include and/or facilitate, for example, inter-process communication, local function or procedure calls, remote procedure calls, network-based communication, secure communication, etc.

The communication unit 508 may include one or more interface devices for wired and wireless connectivity with the network 402 and the other entities and/or components of the system 400 including, for example, the client devices 406, the server 420, and the database 510, etc. For instance, the communication unit 508 may include, but is not limited to, CAT-type interfaces; wireless transceivers for sending and receiving signals using Wi-Fi™; Bluetooth®, cellular communications, etc.; USB interfaces; various combinations thereof; etc. In some implementations, the communication unit 508 can link the processor 502 to the network 402, which may in turn be coupled to other processing systems. The communication unit 508 can provide other connections to the network 402 and to other entities of the system 400 using various standard communication protocols, including, for example, those discussed elsewhere herein.

The database 510 is an information source for storing and providing access to data. In some implementations, the database 510 may be coupled to the components 422, 502, 504, 508, 520, 522, 524, 526, and/or 528 of the inference engine 422 via the bus 506 to receive and provide access to data. In some implementations, the database 510 may store data received from the other entities 406, 420, and/or 430 of the system 400, and provide data access to these entities. The database 510 may include one or more non-transitory computer-readable mediums for storing the data. In some implementations, the database 510 may be incorporated with the memory 504 or may be distinct therefrom. In some implementations, the database 510 may include a database management system (DBMS). For example, the DBMS could include a structured query language (SQL) DBMS, a NoSQL DMBS, various combinations thereof, etc. In some implementations, the DBMS may store data in multi-dimensional tables comprised of rows and columns, and manipulate (e.g., insert, query, update and/or delete) rows of data using programmatic operations.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above are primarily in the context of online services; however, the disclosed technologies apply to other data sources and other data.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing," "computing," "calculating," "determining," "displaying," or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions and/or formats. Furthermore, the modules, routines, features, attributes, methodologies, and other aspects of the present technology can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
   receiving, using one or more computing devices, a phone number by a first user;
   receiving, using the one or more computing devices, user-defined information of a second user associated with the phone number;

determining, using the one or more computing device, whether a call period of a call between the first user and the second user satisfies a predetermined threshold;

responsive to the call period satisfying the predetermined threshold, generating, using the one or more computing devices, a canonical representation of the phone number by including a correct number of digits, an area code, and a country code for the phone number, the country code for the phone number being determined using heuristics based on a call log and frequency associated with contacts in the call log;

computing, using the one or more computing devices, a correlation analysis between the canonical representation of the phone number including the correct number of digits, the area code, and the country code for the phone number, the user-defined information, and a database;

identifying, using the one or more computing devices, at least one business contact in the database based on the correlation analysis;

determining whether the at least one business contact is based on a business-chain;

responsive to determining that the at least one business contact is based on the business-chain, selecting and aggregating, using the one or more computing devices, data associated with each business contact in the business-chain; and populating, using the one or more computing devices, information associated with the at least one business contact based on the selected and aggregated data for display to the first user.

2. The method of claim 1, wherein the database includes business names associated with the canonical representation of the phone numbers.

3. The method of claim 1, wherein the data associated with each business contact includes additional information of a business.

4. The method of claim 1, wherein generating the canonical representation of the phone number further comprises:
determining whether the phone number including the country code satisfies requirements of a country associated with the country code; and
responsive to satisfying the requirements of the country associated with the country code, performing standardization of the phone number including the country code.

5. The method of claim 1, wherein the call log includes past phone numbers dialed by the first user.

6. The method of claim 1, wherein the country code is determined based on phone numbers dialed by the first user in the call log.

7. The method of claim 1, further comprising:
determining whether data associated with the at least one business contact includes a canonicalized phone number stored in the database; and
responsive to the data associated with the at least one business contact including the canonicalized phone number stored in the database, marking the canonicalized phone number associated with the at least one business contact.

8. The method of claim 1, further comprising:
determining whether data associated with the at least one business contact includes a canonicalized phone number stored in the database; and
responsive to the data associated with the at least one business contact including the canonicalized phone number stored in the database, preventing alteration of the canonicalized phone number stored in the database.

9. A computer program product comprising a non-transitory computer usable medium including a computer readable program, wherein the computer readable program when executed on a computer causes the computer to:
receive a phone number by a first user;
receive user-defined information of a second user associated with the phone number;
determine, using the one or more computing device, whether a call period of a call between the first user and the second user satisfies a predetermined threshold;
responsive to the call period satisfying the predetermined threshold, generate a canonical representation of the phone number by including a correct number of digits, an area code, and a country code for the phone number, the country code for the phone number being determined using heuristics based on a call log and frequency associated with contacts in the call log;
compute a correlation analysis between the canonical representation of the phone number including the correct number of digits, the area code, and the country code for the phone number, the user-defined information, and a database;
identify at least one business contact in the database based on the correlation analysis;
determine whether the at least one business contact is based on a business-chain;
responsive to determining that the at least one business contact is based on the business-chain, select and aggregate data associated with each business contact in the business-chain; and
populate information associated with the at least one business contact based on the selected and aggregated data for display to the first user.

10. The computer program product of claim 9, wherein the database includes business names associated with the canonical representation of the phone numbers.

11. The computer program product of claim 9, wherein the data associated with each business contact includes additional information of a business.

12. The computer program product of claim 9, wherein generating the canonical representation of the phone number further comprises:
determining whether the phone number including the country code satisfies requirements of a country associated with the country code; and
responsive to satisfying the requirements of the country associated with the country code, performing standardization of the phone number including the country code.

13. The computer program product of claim 9, wherein the call log includes past phone numbers dialed by the first user.

14. The computer program product of claim 9, wherein the country code is determined based on phone numbers dialed by the first user in the call log.

15. A system comprising:
a processor; and
a user interface module executable by the processor and a memory storing instructions, the user interface module configured to receive a phone number by a first user and receive user-defined information of a second user associated with the phone number;
a standardization module, coupled to the user interface module, and configured to determine whether a call period of a call between the first user and the second user satisfies a predetermined threshold, and responsive to the call period satisfying the predetermined threshold, generate a canonical representation of the phone number by including a correct number of digits, an area code, and a country code for the phone number, the country code for the phone number being determined using heuristics based on a call log and frequency associated with contacts in the call log;

a correlation module coupled to the user interface module and configured to compute a correlation analysis between the canonical representation of the phone number including the correct number of digits, the area code, and the country code for the phone number, the user-defined information, and a database;

a phone number lookup module coupled to the user interface module and configured to identify at least one business contact in the database based on the correlation analysis, and the phone number lookup module further coupled to the correlation module configured to determine whether the at least one business contact is based on a business-chain, and responsive to determining that the at least one business contact is based on the business-chain, aggregate data associated with each business contact in the business-chain; and a data selection module coupled to the user interface module and configured to select the data associated with the at least one business contact and populate information associated with the at least one business contact based on the selected and aggregated data for display to the first user.

16. The system of claim 15, wherein the database includes business names associated with the canonical representation of the phone numbers.

17. The system of claim 15, wherein the data associated with each business contact includes additional information of a business.

18. The system of claim 15, wherein generating the canonical representation of the phone number further comprises:

determining whether the phone number including the country code satisfies requirements of a country associated with the country code; and responsive to satisfying the requirements of the country associated with the country code, performing standardization of the phone number including the country code.

19. The system of claim 15, wherein the call log includes past phone numbers dialed by the first user.

* * * * *